United States Patent [19]

Lerma

[11] Patent Number: 4,630,297
[45] Date of Patent: Dec. 16, 1986

[54] CASSETTE WITH INTENSIFYING SCREENS FOR USE WITH RADIOGRAPHIC FILM

[75] Inventor: Gianfranco Lerma, Ferrania/Savona, Italy

[73] Assignee: Minnesota Mining and Manufacturing Company, St. Paul, Minn.

[21] Appl. No.: 193,381

[22] Filed: Oct. 2, 1980

[30] Foreign Application Priority Data

Oct. 15, 1979 [IT] Italy ............................. 50567 A/79

[51] Int. Cl.$^4$ ............................................. G03B 42/04
[52] U.S. Cl. .................................. 378/185; 250/482.1
[58] Field of Search ............ 250/480, 481, 482, 482.1; 378/185

[56] References Cited

U.S. PATENT DOCUMENTS 2,193,021  3/1940  Dietz .................................. 250/481
3,296,437  1/1967  Meschan .............................. 250/481

Primary Examiner—Craig E. Church
Attorney, Agent, or Firm—Donald M. Sell; James A. Smith; Mark A. Litman

[57] ABSTRACT

The invention relates to a cassette comprising a base lid element hinged at its rear edge to an upper element of the cassette, and intensifying screens fixed on the inside to both said lid element and to said upper element of the cassette, for use with a radiographic film situated between said screens and in close contact with them. The film is caused to separate from a predetermined one of said upper and base screens during the opening of the cassette by providing said upper screen with a non-contact zone along one of its front and rear edges, and said base screen with a non-contact zone along the other of its front and rear edges.

10 Claims, 2 Drawing Figures

U.S. Patent    Dec. 16, 1986    4,630,297
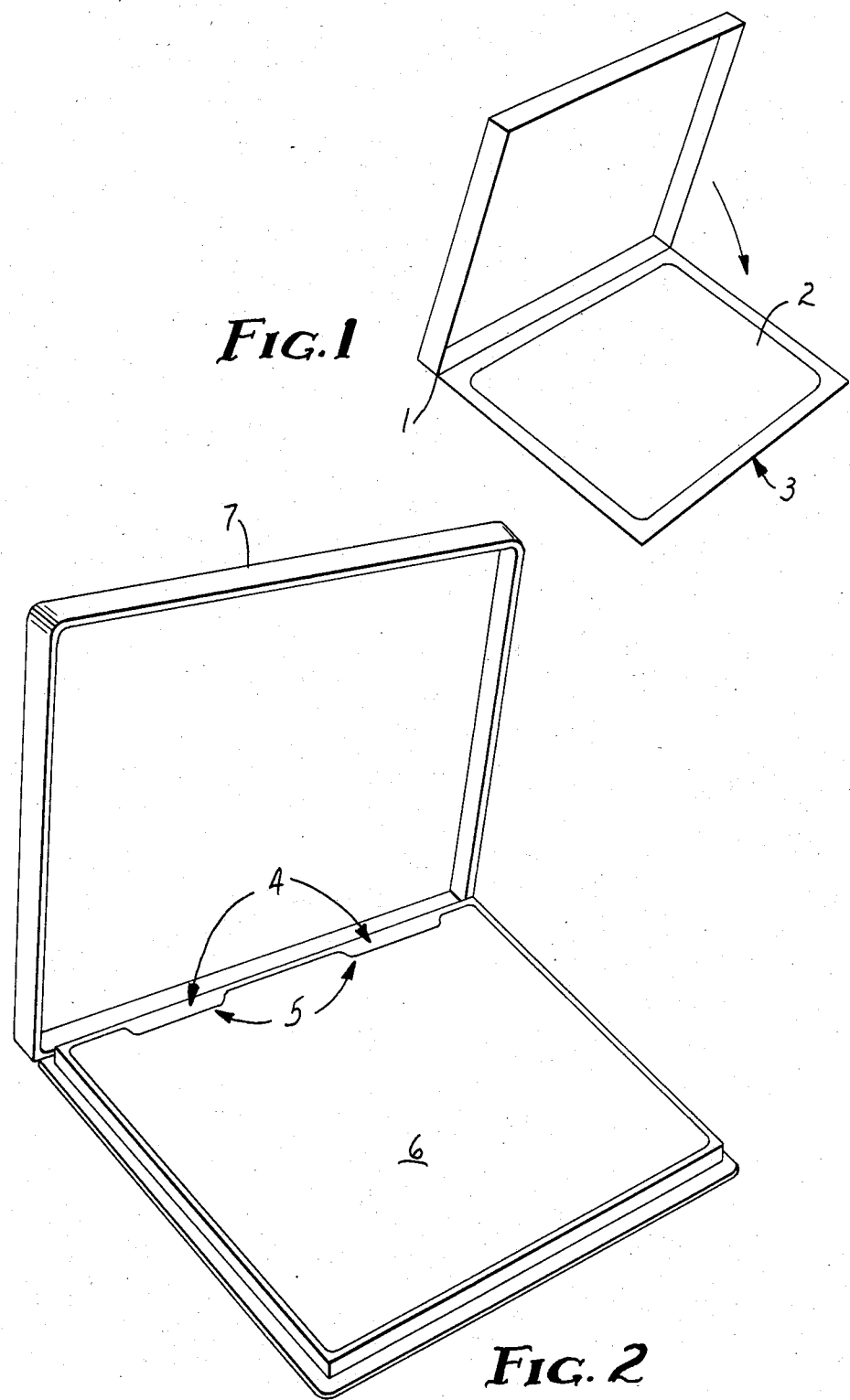

CASSETTE WITH INTENSIFYING SCREENS FOR USE WITH RADIOGRAPHIC FILM

TECHNICAL FIELD

This invention relates to an improved cassette provided with intensifying screens, to intensifying screens for use in said cassette, and to a method for separating a radiographic film from a predetermined screen of the two screens associated with the radiographic film inside the cassette.

BACKGROUND ART

In radiography, the radiographic films are exposed in radiographic cassettes consisting substantially of a base element, generally impermeable to X-rays, and an upper element generally permeable to X-rays, which are joined together by a vertical perimetral element so as to form a container having an essentially flat parallelepiped shape. Said flat horizontal upper and base elements and said vertical element have the minimum dimensions necessary for containing a radiographic film of a certain format disposed between intensifying screens fixed to said upper and base elements. Said screens are uniformly pressed against the film so as to ensure good uniform contact with the film, as known to experts of the art. Said base element is generally constructed in the form of a lid hinged along the rear edge of the cassette.

When such cassettes are opened in an automatic loading and unloading apparatus (especially when the cassette is disposed substantially vertically, as in the case of the apparatus of the applicant), it is normally necessary for the film to separate from a predetermined screen chosen from the base screen and upper screen contained in it (in the case of the apparatus of the applicant, the film must separate from the upper screen). In the absence of any means for controlling the separation of the film from the screens during the opening of the cassette, the film can separate randomly from one or other of said screens, and thus in the past springs have been used in order to cause the film to separate under control, as required. However, such screens can lead to loss of adhesion and loss of sharpness of the image around the zone occupied by them, and easily deteriorate with time.

DISCLOSURE OF THE INVENTION

According to the present invention, it has been found that in a cassette comprising intensifying screens as heretofore described it is possible to cause the film to separate from a predetermined one of the two screens contained therein, by providing one of them with zones of non-contact with the film along its "front" edge (i.e., along the edge opposite to the hinged edge of the screen, which will be called the "rear" edge), and the other with zones of non-contact along the "rear" edge of the screen.

According to one aspect, the present invention relates to an improved cassette comprising a base lid element hinged along its rear edge, and intensifying screens fixed to said lid element and to the upper part of the cassette, for use with a radiographic film situated between said screens and in close contact therewith, the improvement consisting of providing said base screen with a zone of non-contact along one edge chosen from its front and rear edges, and providing said upper screen with a zone of non-contact along the other edge of its (front and rear) edges.

DETAILED DESCRIPTION OF INVENTION

In particular, the present invention relates to an improved cassette as heretofore defined, in which the zones of non-contact are provided respectively along the rear edge of the base screen and along the front edge of the upper screen.

More particularly, the present invention relates to cassettes as heretofore defined, in which the zones of non-contact are either in the form of notches (one or two notches for example) or are provided along the entire edge of one of said upper and base screens. Intensifying screens of rare earth oxysulfides, certain metal sulfides and oxides, etc. are well known in the art.

According to a further aspect, the present invention relates to a radiographic intensifying screen for use in contact with a radiographic film, comprising zones of non-contact with the film cut along one edge chosen from its front and rear edges, said zones being preferably in the form of notches, and more preferably in the form of two notches. These zones of non-contact comprise areas of one screen having greater distance between an edge of the screen and an edge of the cassette than the opposeed or other screen would have from the same edge of the cassette when the cassette is closed.

According to a further aspect, the present invention relates to a method for operating a cassette provided with a base lid element and an upper element having fixed to them intensifying screens with a radiographic film in close contact therewith, and for causing the film to separate from a predetermined one of the upper and base screens during the opening of the cassette, wherein said upper screen is provided with a zone of non-contact along one edge chosen from its front and rear edges, and said base screen is provided with a zone of non-contact along the other edge of its front and rear edges (the film separating from the screen provided with the zone of non-contact along its front edge). When the film is between the screens, there are areas of the film on one side which are contacted by one screen while on the opposite side there is no corresponding contact by said opposed screen.

In the screens the zones of non-contact with the film can obviously be of different shapes and dimensions. However, they should be as small as possible compatible with them operating in the required manner. According to the experience of the applicant, it is convenient to provide a zone of non-contact 2–8, or preferably 5 mm deep (in the direction normal to the edge of the film), and of length at least 20%, and preferably from 30 to 60%, of the length of the edge (if the edge is cut over 100% of its length, there can be problems in quickly and correctly positioning the screen relative to the upper and base elements of the cassette). This non-contact zone can be provided as one, two or three notches or indentations and preferably two notches.

The cassettes comprising screens with non-contact zones according to the present invention operate not only according to the specific objects of the present invention, but have proved particularly suitable for automatic loading and unloading apparatus provided with means (such as sucker means) for withdrawing the film from the cassette.

FIG. 1 shows an open cassette (1) with the radiographic film (2) adhering to the base lid element (3).

FIG. 2 shows a cassette provided with zones of non-contact (4) in the form of two notches (5) provided respectively along the rear edge of the base lid screen (6) and along the front edge of the upper screen, in such a manner as to cause any film therebetween to separate from the upper screen (and to adhere to the base lid screen) as required for use in the loading and unloading apparatus which is already commercially available.

I claim:

1. In a cassette comprising a base lid element and an upper element hinged along their rear edge and opposed intensifying screens fixed, in the interior of said cassette, to said base lid element and to said upper element of the cassette, for use with a radiographic film situated between and in close contact with said screens, the improvement consisting of providing the screen of said base lid element with a zone of non-contact along only one edge chosen from its front and rear edges, and providing said upper screen with a zone of non-contact along the other edge of its front and rear edges, said zones of non-contact comprising areas of one screen having larger distances between an edge of the screen and an edge of the cassette than the opposed screen from the same edge of the cassette.

2. The cassette of claim 1 wherein a radiographic film is situated between and in close contact with said opposed screens.

3. A radiographic cassette provided with intensifying screens as claimed in claims 1 or 2, wherein the zones of non-contact are in the form of notches.

4. A radiographic cassette as claimed in claim 1, wherein said zone of non-contact does not extend to the corners of the edge of the screen having said zone of non-contact.

5. A radiographic cassette provided with intensifying screens as claimed in claim 1, wherein zones of non-contact are provided respectively along the rear edge of the screen fixed to the base lid element and along the front edge of the screen fixed to said upper element.

6. A radiographic cassette as claimed in claim 2 wherein said zone of non-contact does not extend to the corners of the edge of the screen having said zone of non-contact.

7. The cassette of claim 1 wherein said zone of non-contact is 2-8 mm deep and covers at least twenty percent of the length of one edge.

8. A radiographic cassette as claimed in claim 7 wherein said zone of non-contact does not extend to the corners of the edge of the screen having said zone of non-contact.

9. A radiographic cassette comprising a base lid element and an upper element hinged along their rear edge and opposed intensifying screens fixed, in the interior of the cassette, to said base lid element and to said upper element of the cassette, for use with a radiographic film situated between and in close contact with said screens, the improvement consisting of providing the screen of said base lid element with a zone of non-contact along the entire edge of said screen, said zone of non-contact chosen from front and rear edges of said screen of said base lid element, said zone of non-contact comprising an area of said screen of said base lid element having larger distances between the edge of the screen of said base lid element and an edge of the cassette than the opposed screen from the same edge of the cassette.

10. A radiographic intensifying screen for use in contact with a radiographic film to provide at least one zone of non-contact with the film, said screen having at least one notch cut along only one edge chosen from its front and rear edges wherein the zone of non-contact is in the form of two notches.

* * * * *